(12) United States Patent
Dziobek et al.

(10) Patent No.: US 7,258,849 B2
(45) Date of Patent: Aug. 21, 2007

(54) METHOD FOR THE PRODUCTION OF NITRIC ACID

(75) Inventors: Frank Dziobek, Muehlheim/Ruhr (DE); Detlev Claes, Bochum (DE); Joachim Johanning, Oberhausen (DE); Rainer Maurer, Schwelm (DE); Erich Szonn, Witten (DE)

(73) Assignee: UHDE GmbH, Dortmund (DE)

( * ) Notice: Subject to any disclaimer, the term of this patent is extended or adjusted under 35 U.S.C. 154(b) by 282 days.

(21) Appl. No.: 10/505,242

(22) PCT Filed: Feb. 15, 2003

(86) PCT No.: PCT/EP03/01538

§ 371 (c)(1),
(2), (4) Date: Dec. 30, 2004

(87) PCT Pub. No.: WO03/070634

PCT Pub. Date: Aug. 28, 2003

(65) Prior Publication Data

US 2005/0106092 A1    May 19, 2005

(30) Foreign Application Priority Data

Feb. 22, 2002   (DE) ............................... 102 07 627

(51) Int. Cl.
*C01B 21/24*    (2006.01)
*C01B 21/26*    (2006.01)
*C01B 21/38*    (2006.01)
*C01B 21/40*    (2006.01)

(52) U.S. Cl. ...................................................... 423/392
(58) Field of Classification Search ................ 423/392, 423/393, 403, 404
See application file for complete search history.

(56) References Cited

U.S. PATENT DOCUMENTS 2,226,149 A * 12/1940 Zimmermann .............. 423/403

(Continued)

FOREIGN PATENT DOCUMENTS

DE         19 11 200 A       9/1970

(Continued)

OTHER PUBLICATIONS

*Inorganic Oxygen Compounds*, "Winnacker/Küchler" Chemische Technolgie, vol. 2, Inorganic Technology 1, 4$^{th}$ Ed., published by Mundo/Weber, Carl Hanser Publishing House in Munich & Vienna, no date.

*Primary Examiner*—Wayne A. Langel
(74) *Attorney, Agent, or Firm*—Marshall & Melhorn, LLC

(57) ABSTRACT

The invention relates to a method for the production of nitric acid having a concentration of between 50 and 76%, from ammonia and gas containing oxygen, under pressure, according to a single pressure method or dual pressure method. The expansion of the residual gas takes place in at least two stages in a work efficient manner. At least one device for heating the previously expanded gas to a temperature of more than 450° is disposed between every other expansion stage, using waste heat from the production process of nitric acid.

5 Claims, 1 Drawing Sheet

U.S. PATENT DOCUMENTS

| | | | |
|---|---|---|---|
| 2,942,953 A * | 6/1960 | Shields | 422/162 |
| 3,450,498 A * | 6/1969 | Sales | 423/392 |
| 3,592,591 A * | 7/1971 | Morrow | 423/392 |
| 4,263,267 A | 4/1981 | Henckens et al. | |
| 4,957,720 A * | 9/1990 | Wiegand et al. | 423/392 |
| 5,537,822 A | 7/1996 | Shnaid et al. | |
| 5,985,230 A * | 11/1999 | Vlaming et al. | 423/392 |
| 6,056,928 A * | 5/2000 | Fetzer et al. | 423/235 |
| 6,264,910 B1 * | 7/2001 | Maurer et al. | 423/392 |
| 7,118,723 B2 * | 10/2006 | Maurer | 423/392 |

FOREIGN PATENT DOCUMENTS

| | | | |
|---|---|---|---|
| DE | 20 02 791 A | | 7/1971 |
| DE | 39 12 650 A1 | | 10/1990 |
| DE | 44 10 440 A1 | | 8/1995 |
| EP | 0 154 470 A | | 9/1985 |
| EP | 0301844 | * | 2/1989 |
| EP | 0 945 400 A | | 9/1999 |
| WO | WO 01 68520 | | 9/2001 |

* cited by examiner

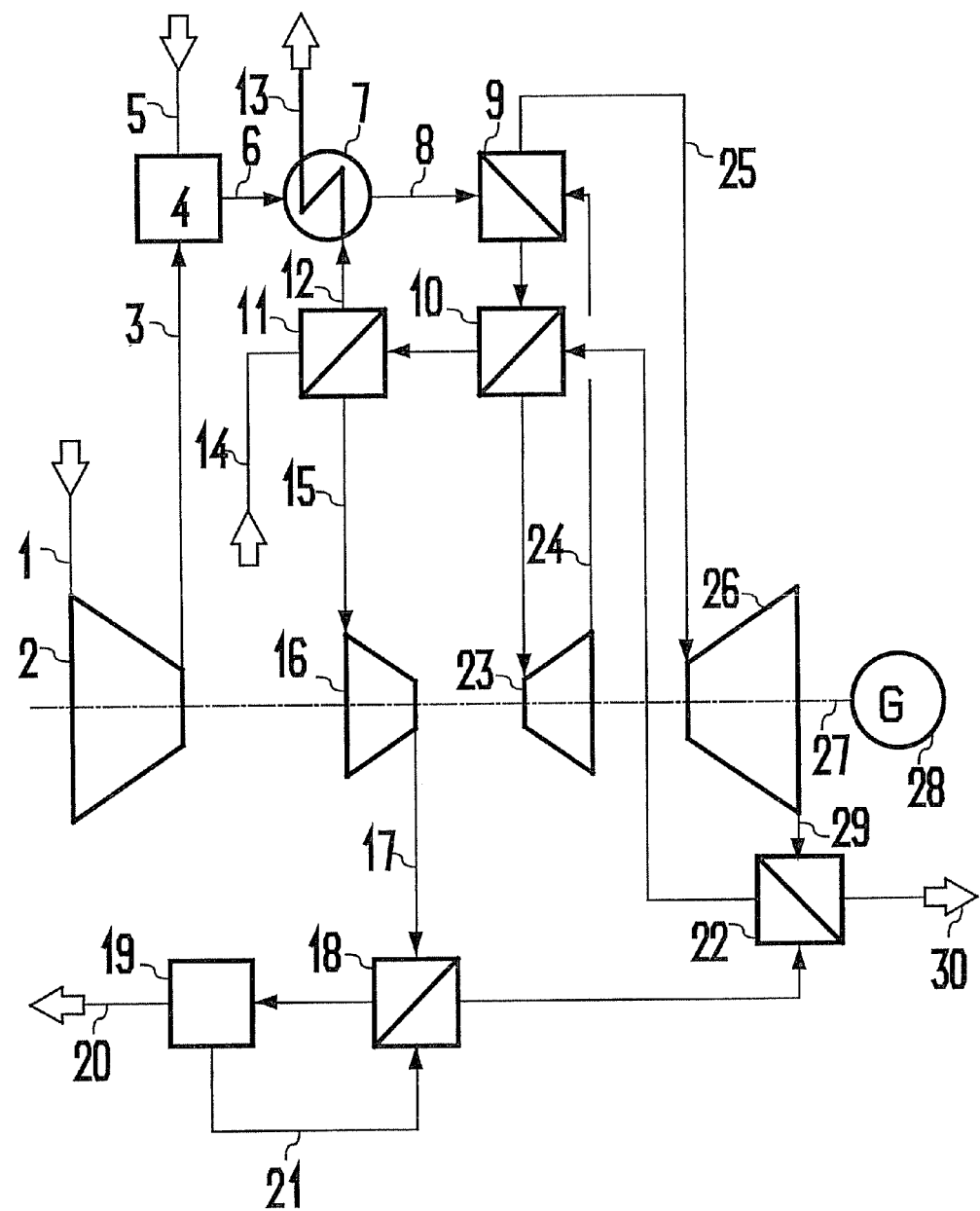
Fig.

METHOD FOR THE PRODUCTION OF NITRIC ACID

BACKGROUND OF THE INVENTION

The invention relates to a particularly economic process for the production of nitric acid with an approx. content of 50 to 76%, said process using the combustion of ammonia under pressure with the aid of an oxygen-bearing gas, in particular air, thereby simultaneously exploiting the reaction heat for the recovery of useful energy made available as steam or electric power.

Nitric acid with a concentration of 50 to 76 percent is normally produced in plants using the Ostwald process as described, for instance, in the paper "Inorganic oxygen compounds" published by Mundo/Weber, Carl Hanser Publishing House in Munich and Vienna, 1982, a special print extracted from "Winnacker/Küchler" Chemische Technologie, volume 2, Inorganic Technology I, $4^{th}$ edition, and in WO 01/68520 A 1.

According to said technology there are a mono-pressure and a dual pressure process. The monopressure processes first provide for a compression of the air to medium pressure of about 5 bar or to a high pressure of about 8 bar, pressurised ammonia being admixed and the mixture then being catalytically burnt. Upon cooling, the nitric oxide thus formed comes into contact with compressed secondary air and is absorbed in an aqueous solution so that nitric acid is obtained. The residual gas hereinafter referred to as tail gas is purified and released into the atmosphere.

Downstream of the catalytic combustion and the subsequent cooling, the dual pressure process provides for a further compression step in order to run the absorption at a pressure higher than that of the combustion.

The single or multi-stage compression of the input gas, normally air, and the expansion of the tail gas usually take place in turbo-compressors and turbo-expanders, all of which are arranged on a common gear shaft an thus interconnected with each other, the different speeds of the machines being compensated by means of drive gears. As the potential energy produced by the gas expansion is normally insufficient for operating the compression unit of the input gas, it is necessary to provide additional drive energy.

The state-of-the-art technique provides for this additional drive energy by way of an energy-optimised steam turbine operated with the aid of a portion of the steam obtained by cooling of the gas rich in nitric oxide in steam generators arranged downstream of the catalytic combustion step. The said steam turbine is also exploited for the process start-up and persons skilled in the art consider this unit to be indispensable.

A disadvantage, however, is the steam consumption of the turbine which accounts for one fifth to one third of the overall steam production. This particularly applies to the said configuration if the steam thus produced could be used for other purposes in the plant, e.g. for nitric acid concentration, electric power production or heating etc. provided the plant for nitric acid production is part of a larger complex. But if a steam turbine is not provided as auxiliary drive it is necessary to boost the residual gas expander capacity in such a manner that its output equals the power input of the compressors. Using this technology in accordance with the conventional technique will produce problems that can hardly be overcome.

An aim of the invention is to redesign the nitric acid plant in such a manner that more useful energy becomes available in the form of process steam or electric power for export to external power consumers. The aim also includes that the standard operation of a steam turbine should be omitted and that the steam quantity thus saved be exploited for other purposes or that the said standard operation of a steam turbine should essentially be devoted to power generation instead of compressor drive. Moreover, the aim also encompasses a configuration that has no steam turbine at all yet providing an economy.

SUMMARY OF THE INVENTION

The invention provides for the following technological solution:

the expansion of the tail gas, thereby converting the gas to energy, takes place in at least two steps;

the said configuration provides for a device arranged between each pair of expansion units and intended for heating the previously expanded tail gas to a temperature of >450° C., the said system exploiting the waste heat from the nitric acid production process.

It was surprising to find that the energy recoverable in the turbo-expanders was exactly sufficient to drive the turbo-compressor(s). This is a very astonishing fact as the splitting up of one expansion step into several steps inevitably leads to a reduction of the thermal efficiency of said expansion, in particular if an intermediate heating takes place. This conclusion is drawn from the thermodynamic laws of the open gas turbine process, hereinafter referred to as Joule cycle, which is characterised by a series arrangement of the adiabatic compression, isobar heat input, adiabatic expansion and isobar heat removal by way of waste gas discharge.

The most important characteristic value of the Joule process is the thermal efficiency $\eta$ that establishes the ratio between the output P and the head input stream Q as follows: $\eta=P/Q$. In the ideal Joule cycle, the thermal efficiency of a given gas merely depends on the ratio between the pressure upstream of the compression and that downstream of the compression. Where: $\eta_K=1-(p_1/p_2)^n$ with $n=1-1/\kappa$, ($\kappa$=isotropic exponent), $p_1$ being the initial pressure and $P_2$ the final pressure. In this case the thermal efficiency is independent of the heat input quantity.

But if the expansion is split up into two steps, each of them being fed with heat, the overall thermal efficiency can decrease only. When viewing a thermodynamic loop cycle which operates at a pressure $p_m$ set in the range of $p_1$ and $p_2$, part of the heat being input, the formula $\eta=1-(p_1/p_2)^n$ only applies to the first expansion step whereas the second step is subject to $\eta=1-(p_1/p_m)^n$, where $p_1/p_m$ exceeds $p_1/p_2$. This lower pressure ratio acting on the second expansion step, hence, reduces the thermal efficiency of the second step compared to that of the first step. Hence, the said reduction of the overall efficiency applies to any such total. This analogously applies to any multi-step expansion.

As the nitric acid production process can roughly be represented as such a loop cycle, the heat input in this case being performed with the aid of the released reaction enthalpy as well as heat transfer systems, a person skilled in the art draws the conclusion that splitting up the expansion into several steps combined with intermediate heating, would normally entail a decrease in the overall thermal efficiency and consequently cause a reduction of the recoverable heat portion which can be converted to drive energy. So there was a prejudice against the configuration according to which splitting up the expansion into several steps could yield more drive energy than can be obtained by a mono-step expansion.

In the case of the nitric acid production process, however, it was found that the expander efficiency reduction resulting from the thermodynamics produces no effect on the overall thermal efficiency of the plant. Compared to a mono-step expansion, the two-step expansion that has the same overall heat input to the tail gas in fact reaches a higher tail gas temperature downstream of the last step but the heat in the tail gas becomes exploitable because of the higher temperature in a nitric acid plant. Hence, the expected reduction of the overall efficiency is overcompensated because a substantially larger portion of the waste heat becomes exploitable. In the past the said portion had to be discharged into the atmosphere because its temperature level was very low so that it could not be exploited economically.

It was also found that beyond the amount of energy required for the compression drives, the expansion steps can also generate mechanical surplus energy, provided the temperature of the tail gas fed to the expansion steps is set to >450° C., in particular the range from 500 to 600° C. It turned out that a temperature favouring the economy was 535° C. provided the surplus drive energy is intended for electric power generation. However, the temperature optimised to ensure economy depends in various respects on the specific conditions so that it must be determined on a case-to-case basis. Apart from being usable for electric power generation, the mechanical energy is also suitable for driving the refrigeration equipment or other power consumers. In conjunction with the specific demand of such additional consumers, a change in the gas inlet temperature of the respective expansion steps becomes necessary; the said inlet temperature in the expansion steps may in fact differ.

One embodiment of the invention therefore provides for a gas inlet temperature of 500 to 600° C., preferably 535° C. for the expansion steps, thereby supplying drive energy to further consumers.

In a further embodiment of the invention it is intended to use the surplus drive energy for a generator in order to produce electric power. A motor-generator set is especially preferred for this purpose because the output of said machine is sufficient to ensure the compression drive at the plant startup. This technique permits a configuration without steam turbine.

If a steam turbine already exists, for example, in the case of revamping an existing state-of-the art plant, it is also possible to exploit such a steam turbine additionally for the generation of electric power and to substantially increase the electric power production.

BRIEF DESCRIPTION OF THE DRAWINGS

The typical configuration described in the next paragraphs serves to illustrate the invention. The FIGURE shows a block diagram of a plant for the production of nitric acid with 68% concentration, said plant using the dual pressure process and consisting of the main equipment for compression, combustion, steam generation, absorption and as indicated in this example, a two-step tail gas expansion as well as the internal heat transfer systems und surplus energy exploitation units. The following equipment items are not shown in the diagram: gas treatment, filter units, temperature fine-tuning, controls, secondary air input, etc.

DESCRIPTION OF THE PREFERRED EMBODIMENT

Air (1) is compressed in pre-compression unit (2) and a part stream thereof is fed as combustion air (3) to the catalytic combustion unit (4) in which it is burned together with ammonia (5) so that NO rich gas (6) is obtained at a temperature of about 900° C. This NO rich gas (6) is first slightly cooled in partial evaporator/superheater (7), the NO rich gas (8) is then exploited in the gas/gas heat exchangers (9 and 10) for heating the tail gas (see below) and finally cooled in partial evaporator/economiser (11). A mixture of water/steam (12) is first produced from feed water (14) in partial evaporator/economiser (11) and said mixture is subsequently used in the partial evaporator/superheater (7) to produce superheated steam (13). The cooled NO rich gas (15) undergoes a secondary compression in NO compression unit (16). The secondary compressed NO gas (17) is cooled in gas/gas heat exchanger (18) and converted to nitric acid (20) in absorption unit (19).

Tail gas (21) almost completely denoxed is reheated in gas/gas heat exchangers (18, 22, 10) to a temperature of 535° C. and then fed to first expansion step (23), thereby producing drive energy while undergoing partial expansion to obtain an adequate pressure. This cools the tail gas. The heat in tail gas (24) converted to drive energy is replaced in gas/gas heat exchanger (9), the tail gas (25) re-heated to 535° C. being fed to the second expansion step (26) in which said gas is expanded to ambient pressure and hence releases drive energy. The expanded tail gas (29) undergoes a secondary cooling in gas/gas heat exchanger (22) and is released into the atmosphere (30); it is of course possible to arrange gas treatment units (not shown in the diagram) between the individual steps.

Pre-compression unit (2) and NO compression (16) in conjunction with expansion steps (23 and 26) are preferably arranged on one drive shaft (27) or linked with each other via gears, said drive shaft supplying the drive energy produced in the expansion steps and required for the compression steps. The arrangement of the compression and expansion steps on drive shaft (27) is by no means restricted to the layout shown in the FIGURE but may also be devised in a different manner. The available surplus energy is fed to generator (28) which produces electric power likewise fed to external consumers as in the case of steam (13).

The table below shows a summary of the various energy quantities obtained in a favourable operational mode without the generation of electric power, said quantities being referred to 1 tonne of nitric acid each (kWh per t $HNO_3$), the negative values representing input and positive values representing output.

|  | (kWh pro t $HNO_3$) |
|---|---|
| Pre-compression | −271 |
| NO compression 16 | −173 |
| first expansion step 23 | +228 |
| second expansion step 26 | +216 |
|  | (kg pro t $HNO_3$) |
| superheated steam 23 | 960 |

| Key to graphic symbols | |
|---|---|
| 1 | Air |
| 2 | Pre-compression |
| 3 | Combustion air |
| 4 | Catalytic combustion |
| 5 | Ammonia |

-continued

| Key to graphic symbols | |
| --- | --- |
| 6 | NO rich gas |
| 7 | Partial evaporator/superheater |
| 8 | NO rich gas |
| 9 | gas/gas heat exchanger |
| 10 | gas/gas heat exchanger |
| 11 | Partial evaporator/economiser |
| 12 | Water/steam |
| 13 | superheated steam |
| 14 | Feed water |
| 15 | cooled NO gas |
| 16 | NO compression |
| 17 | NO gas from secondary compression |
| 18 | gas/gas heat exchanger |
| 19 | Absorption |
| 20 | Nitric acid |
| 21 | Tail gas |
| 22 | gas/gas heat exchanger |
| 23 | first expansion step 23 |
| 24 | Tail gas partially expanded |
| 25 | Re-heated tail gas |
| 26 | second expansion step 26 |
| 27 | Drive shaft |
| 28 | Alternator |
| 29 | expanded tail gas |
| 30 | Atmosphere |

The invention claimed is:

1. A process for the production of nitric acid with a concentration of 50 to 76% from ammonia and oxygen-bearing gas under pressure, using the mono or dual pressure process, wherein
   tail gas is expanded wherein the expansion takes place in at least two pressure steps, thereby converting the heat of the gas to energy by means of gas turbines operating at different pressure,
   a device is provided between every two gas turbines and heats the expanded tail gas to a temperature of >450° C., the said system exploiting the waste heat from the nitric acid production process.

2. The process according to claim 1, comprising a gas inlet temperature of 500 to 600° C., for the expansion steps, thereby supplying drive energy to further consumers.

3. The process according to claim 1, wherein the surplus drive energy is provided to for a generator in order to produce electric power.

4. The process according to claim 3, wherein a motor-generator set is provided which is sufficient to ensure the compression drive at the plant startup.

5. The process according to claim 2, wherein the gas inlet temperature is 535° C. for the expansion steps.

* * * * *